(No Model.)
2 Sheets—Sheet 1.

F. F. WORMER.
STEAM SEPARATOR.

No. 597,232.   Patented Jan. 11, 1898.

WITNESSES
G. M. Davis
W. H. Nantais

INVENTOR
Frederick F. Wormer
By Fisk & Thomas
Attys (No Model.)   F. F. WORMER.   2 Sheets—Sheet 2.
STEAM SEPARATOR.

No. 597,232.   Patented Jan. 11, 1898.

WITNESSES
G. M. Davis.
W. N. Mantais

INVENTOR
Frederick F. Wormer
By Fisk & Thomas
attys

UNITED STATES PATENT OFFICE

FREDERICK F. WORMER, OF DETROIT, MICHIGAN, ASSIGNOR TO THE AUSTIN SEPARATOR COMPANY, OF SAME PLACE.

STEAM-SEPARATOR.

SPECIFICATION forming part of Letters Patent No. 597,232, dated January 11, 1898.

Application filed September 16, 1897. Serial No. 651,857. (No model.)

*To all whom it may concern:*

Be it known that I, FREDERICK F. WORMER, a citizen of the United States, residing at Detroit, county of Wayne, State of Michigan, have invented a certain new and useful Improvement in Steam-Separators; and I declare the following to be a full, clear, and exact description of the invention, such as will enable others skilled in the art to which it pertains to make and use the same, reference being had to the accompanying drawings, which form a part of this specification.

My invention relates to steam-separators, and is designed and constructed more especially for use in connection with high-pressure steam, but is equally adapted to exhaust-steam. The object of the particular construction employed is to provide means for separating the water with which the passing steam is saturated from the steam and discharging it out of the separator through means adapted to prevent the siphoning of any water that may accumulate in the water-chamber. While these separators are provided with steam-traps in the discharge-pipe and are supposed to be under constant attention from the engineer, it is nevertheless a great advantage to provide means to prevent the siphoning or drawing of the water out of the water-chamber when the same becomes filled by reason of the carelessness of the attendants, the failure of the steam-trap to operate, or a high degree of saturation of the steam from unexpected causes. The means employed by me to successfully separate the water and at the same time prevent the siphoning are shown in the accompanying drawings, in which—

Figure 1:
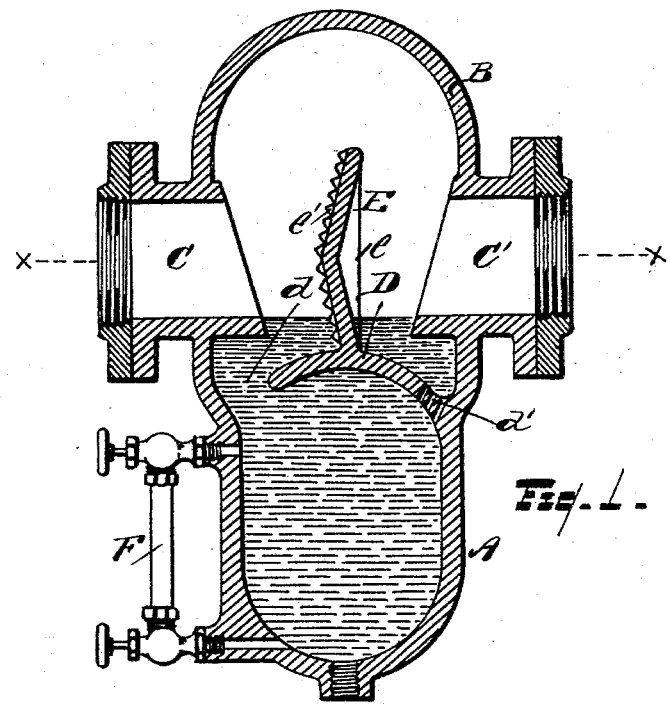
Figure 2:
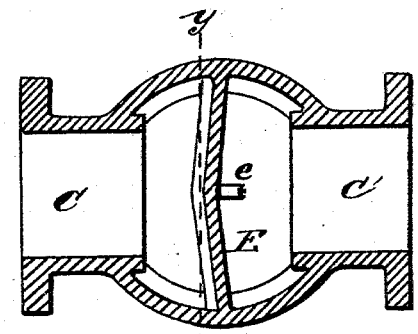
Figure 3:
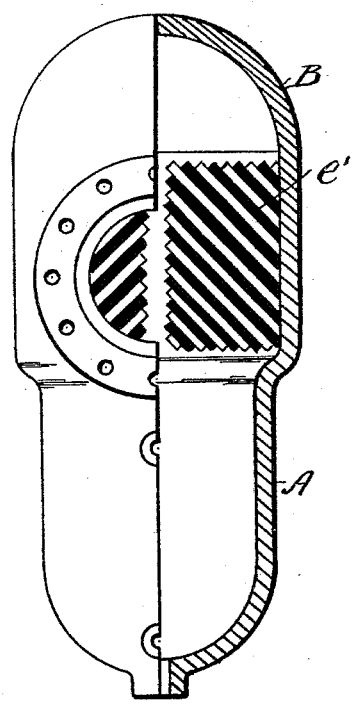

Figure 1 is a cross-sectional view of a separator embodying my invention, taken on the line of the steam inlet and outlet. Fig. 2 is a horizontal cross-section of the separator embodying my invention, made on line $x\,x$ of Fig. 1. Fig. 3 is a cross-sectional view on line $y\,y$ of Fig. 2.

In the drawings, A represents the walls of the lower portion or water-chamber of the separator, and B represents the walls of the upper portion or dome. The water-chamber and dome are each made round and conform as nearly as possible to the shape giving the greatest resistance against internal pressure.

C represents the steam-inlet, and C' the steam-outlet, each being provided with the usual means for connecting the separator in a line of steam-pipe.

D is a transverse dividing-wall extending from the outlet side of the separator nearly across the water-chamber to the opposite side, leaving the open space $d$ near the wall of the inlet side. This dividing-wall is located just below the lower edge of the inlet and outlet pipes and is provided near the outlet-pipe with a small drip passage or passages $d'$.

E is a vertical baffle-plate rising from the dividing-wall D and formed integral with said wall and with the side walls or casing of the separator. This baffle-plate is situated about midway between the inlet and outlet passages and rises some distance above the upper edge of each, and as it extends from one side wall to the other it forms a complete obstruction to the direct passage of the steam from the inlet to the outlet passage.

$e$ is a strengthening or supporting rib rising from the wall D and extending along the back of the baffle-plate to support it against the impinging steam.

$e'\,e'$ are diagonal corrugations on the side of the baffle-plate facing the steam-inlet.

F represents the usual glass sight-tube, adapted to show the amount of water accumulated in the water-chamber.

The operation of my device is as follows: The steam entering the inlet-pipe C is directed against the baffle-plate E and is deflected upward and is forced to lift over the baffle-plate and then descend back of it to the outlet-pipe C'. In passing over the baffle-plate the water with which the steam is saturated is carried against the baffle-plate in the manner common to these devices and accumulates on its face, from which it runs downward and ultimately into the water-chamber. Such part of the extracted water as gathers on the walls of the separator beyond the baffle-plate descends onto the dividing-wall and is conducted into the water-chamber through the openings $d'$. The function of the dividing-plate D is to prevent the siphoning of the water that may have gathered in the water-chamber, the resistance to the upward passage of the water through the limited water-passages in the wall being greater than the siphoning action of the steam over it. In actual operation the device may fill with water up to the inlet and outlet passages with no more serious consequences than the carrying forward of such water as the moving steam contains. While the presence of the horizontal dividing-wall will prevent the siphoning, the use of the vertical baffle-plate, in combination with the dividing-wall, by which the steam is lifted upward and then downward, as distinguished from a movement around the side of the baffle-plate, increases the efficiency of the dividing-wall by giving to the steam a downward movement back of the baffle-plate, and thereby largely reduces its siphoning action, the operation being to project such water as remains in the steam onto the dividing-wall back of the baffle-plate rather than to siphon the water that has accumulated there off.

As shown in Fig. 1, I extend the lower edge of the inlet and outlet pipes into the separator, thereby giving the inner face an incline outward toward the top. This construction opens the passage up over the baffle-plate. In connection with this form given to the inlet and outlet pipes I construct the vertical baffle-plate on a double incline, inclining it forward from about the center of the inlet-pipe to the upper end and in the same direction from the center downward to the point where it connects with the dividing-wall. I prefer also to make the dividing-wall with an upward curve and to extend the edge adjacent to the opening $d$ under the lower edge of the inlet-pipe to make an indirect passage for the water, and thereby increase the resistance to the siphoning action of the steam.

What I claim is—

1. In a steam-separator the combination of the casing provided with inlet and outlet passages, a horizontal wall located below the inlet and outlet passages, and a baffle-plate extending across the case and from the horizontal wall to a line above the inlet and outlet passages, whereby the steam is forced over the baffle-plate, substantially as described.

2. In a steam-separator, the combination of a casing provided with the inlet and outlet passages, the horizontal dividing-wall provided with openings through which to drain the water into the water-chamber, and the baffle-plate rising from said dividing-wall and extending from side to side of the casing, whereby the steam is forced upward over the baffle-plate and then downward to the outward passage, substantially as described.

3. In a steam-separator, the combination of a casing provided with inlet and outlet passages, said inlet and outlet passages extending inward at the lower edge, and a dividing-wall extending across the separator under the inlet and outlet passages, said wall provided with drip-passages at the outer edge underneath the inlet and outlet pipes, substantially as described.

4. In a steam-separator, the combination of a casing provided with inlet and outlet passages, the horizontal dividing-wall provided with suitable drip-passages, and a baffle-plate rising from said dividing-wall, and made on a double incline, substantially as described.

In testimony whereof I sign this specification in the presence of two witnesses.

FREDERICK F. WORMER.

Witnesses:
S. E. THOMAS,
G. M. DAVIS.